(12) United States Patent
McCreight

(10) Patent No.: US 12,716,667 B2
(45) Date of Patent: Aug. 25, 2026

(54) 3D PRINTED BOLT RECEIVER WITH REINFORCING BLADE AND PICATINNY RAIL

(71) Applicant: Bobby McCreight, Bulverde, TX (US)

(72) Inventor: Bobby McCreight, Bulverde, TX (US)

( * ) Notice: Subject to any disclaimer, the term of this patent is extended or adjusted under 35 U.S.C. 154(b) by 0 days.

(21) Appl. No.: 18/968,831

(22) Filed: Dec. 4, 2024

(65) Prior Publication Data

US 2025/0180313 A1 Jun. 5, 2025

Related U.S. Application Data

(60) Provisional application No. 63/619,921, filed on Jan. 11, 2024, provisional application No. 63/605,832, filed on Dec. 4, 2023.

(51) Int. Cl.
*F41A 3/66* (2006.01)
*B33Y 80/00* (2015.01)
*F41G 11/00* (2006.01)

(52) U.S. Cl.
CPC ................ *F41A 3/66* (2013.01); *B33Y 80/00* (2014.12); *F41G 11/003* (2013.01)

(58) Field of Classification Search
CPC ...... F41A 3/20; F41A 3/22; F41A 3/26; F41A 3/66

(Continued)

(56) References Cited

U.S. PATENT DOCUMENTS 4,601,124 A * 7/1986 Brown, Jr. ................ F41A 3/66 42/75.03
10,222,166 B1 3/2019 Sheridan (Continued)

FOREIGN PATENT DOCUMENTS

WO WO 2008118504 10/2008
WO WO 2008137187 11/2008
WO WO 2016025534 2/2016

OTHER PUBLICATIONS

International Search Report and Written Opinion of the International Searching Authority, mailed on Mar. 14, 2025, from International Application No. PCT/US2024/058480, filed on Dec. 4, 2024. 8 pages.

(Continued)

*Primary Examiner* — Reginald S Tillman, Jr.

(74) *Attorney, Agent, or Firm* — HoustonHogle LLP

(57) ABSTRACT

An improved receiver such as for bolt action firearms has an integrally formed reinforcing feature or blade situated below the ejection port. This blade extends longitudinally from the proximal receiver bridge to the distal receiver bridge and may continue into the barrel boss region. Functioning like an arch bridge, the reinforcing blade significantly enhances the structural rigidity of the bolt receiver at its weakest point around the ejection port, reducing flexion during firing and minimizing fatigue. The blade tapers in thickness both laterally away from the receiver's centerline and longitudinally toward the distal end, optimizing material usage while maximizing structural benefits. The bolt receiver is preferably fabricated as a single, monolithic structure using metal 3D printing technology, which allows for the integral formation of additional features such as a Picatinny rail on the top surface and a recoil lug at the distal end portion. These integrated components collectively improve the receiver's functionality, durability, and versatility.

13 Claims, 5 Drawing Sheets

(58) Field of Classification Search
USPC .................................................................. 42/6
See application file for complete search history.

(56) References Cited

U.S. PATENT DOCUMENTS

| | | | | |
|---|---|---|---|---|
| 10,746,488 | B1 | 8/2020 | Regan | |
| 11,519,690 | B2 | 12/2022 | Aldstadt | |
| 11,525,644 | B1 | 12/2022 | Flick | |
| 11,662,174 | B1 | 5/2023 | McLeod | |
| 11,732,984 | B2 * | 8/2023 | Ayotte | F41A 9/29 89/33.2 |
| 12,104,872 | B1 | 10/2024 | Bray | |
| 2011/0094136 | A1 | 4/2011 | Zimmerman | |
| 2015/0198397 | A1 * | 7/2015 | Motley | F41G 11/003 42/90 |
| 2017/0115079 | A1 | 4/2017 | Uselton | |
| 2018/0195838 | A1 | 7/2018 | Storch | |
| 2020/0064090 | A1 | 2/2020 | Russell | |
| 2020/0256636 | A1 * | 8/2020 | Martini | F41A 35/02 |
| 2020/0271403 | A1 | 8/2020 | Ives | |
| 2021/0003358 | A1 | 1/2021 | Spuhr | |
| 2022/0136788 | A1 | 5/2022 | Caudle et al. | |
| 2022/0252367 | A1 | 8/2022 | Robinson et al. | |
| 2022/0282950 | A1 | 9/2022 | Aldstadt | |
| 2025/0237445 | A1 | 7/2025 | Bray | |

OTHER PUBLICATIONS

International Search Report and Written Opinion of the International Searching Authority, mailed on Feb. 26, 2025, from International Application No. PCT/US2024/058482, filed Dec. 4, 2024. 10 pages.

Office Action, mailed on Mar. 24, 2026, from U.S. Appl. No. 18/968,838, filed Dec. 4, 2024. 14 pages.

International Preliminary Report on Patentability, mailed on Jun. 18, 2026, from International Application No. PCT/US2024/058480, filed on Dec. 4, 2024. 6 pages.

International Preliminary Report on Patentability, mailed on Jun. 18, 2026, from International Application No. PCT/US2024/058482, filed on Dec. 4, 2024. 8 pages.

* cited by examiner

3D PRINTED BOLT RECEIVER WITH REINFORCING BLADE AND PICATINNY RAIL

RELATED APPLICATIONS

This application claims the benefit under 35 USC 119(e) of U.S. Provisional Application No. 63/619,921, filed Jan. 11, 2024, and U.S. Provisional Application No. 63/605,832, filed on Dec. 4, 2023, both of which are incorporated herein by reference in their entirety.

BACKGROUND OF THE INVENTION

Bolt Action (BA) is a type of firearm mechanism commonly used in rifles that involves manually operating a bolt to load cartridge into the chamber as well as to extract and eject the cartridge after the firing. Bolt action rifles are widely used and known for their reliability, accuracy and simplicity, and have been broadly used in hunting, precision shooting and military. Key parts of the bolt action include the bolt assembly which consists of a bolt body, bolt handle, firing pin, extractor and ejector, and locking lugs and a bolt receiver.

The bolt receiver is a component that functions as a shroud or housing that encloses the bolt assembly and that serves multiple purposes: as pressure vessel protection, aesthetic enhancement as well as functional and practical design geometry. It acts as the primary housing for the bolt assembly allowing it to cycle and provides structural framework for other critical components of the firearm such as a primary optic surface located at the top-center of the receiver as has been done since its inception. The receiver sits mechanically and physically between the firearm's barrel and stock or chassis.

The stock, traditionally, is made from wood, but is currently often an aluminum, plastic or composite chassis, designed to support the barreled action. This also provides a comfortable and stable platform for aiming and firing. It has a variety of shapes and can be customizable for ergonomic and shooting needs.

Modern chassis are a traditional stock replacement that offer modularity, allowing adjustments in length of pull, comb height and attachment points for accessories such as rails, and other shooting aids. These chassis are often manufactured from aluminum, composites, or other durable materials and provide more customization options in precision shooting or tactical applications.

A recoil lug is a crucial component in rifles as well. The primary purposes of a recoil lug are recoil management and alignment. Particularly in the bolt-action receiver, it helps to manage the forces generated by the firing of a round by transferring those forces to the stock or chassis. It is often small, usually a flat metal piece located between the barrel and the action of the rifle and often is integral with the receiver. The barrel passes through the recoil lug and the lug itself is sandwiched between the receiver and the stock during assembly. Typically, a recoil lug is located at the front of the receiver, in the location where the barrel is threaded into the receiver.

The most commonly used material is steel such as carbon steel and stainless steel, which gives the receiver a high tensile strength to withstand firing pressure. Other possible materials include nickel alloys, aluminum, steel, titanium and carbon fiber. Aluminum alloy receivers are lightweight and corrosion-resistant and are often used in modern lightweight firearms, particularly semi-automatic rifles and carbines.

Many receivers have an integrated mounting rail located at the 12-o'clock position allowing for the primary day optic, or screw holes to affix such a rail.

SUMMARY OF THE INVENTION

The present invention relates to an improved receiver such as for bolt action firearms, but the principle of receiver design can be used for other actions such as lever-action, pump-action, semi and fully automatic firearms including gas and blowback operated firearms. The principles can be applied to any other receiver when enhanced rigidity and reduced susceptibility to fatigue is desired. Specifically, the invention relates to a reinforcing feature or blade integrally formed usually below the ejection port of the receiver but can be located above the ejection port. This feature often extends from the proximal receiver bridge to the distal receiver bridge, and possibly into the barrel boss region, functioning like an arch bridge to significantly strengthen the receiver at its weakest point—the area around the ejection port and above the magazine opening.

In traditional bolt receivers, substantial material removal around the ejection port creates weak points that can lead to reduced rigidity, leading to flexion during firing, and eventual fatigue. The inventive receiver addresses this issue by incorporating the reinforcing feature or blade, which not only enhances structural integrity but also blends seamlessly with the receiver's design for functional purposes.

Preferably, the receiver is fabricated using metal 3D printing technology. This manufacturing method allows for the integral formation of the reinforcing blade, a Picatinny rail situated above the ejection port, and/or a recoil lug at the distal end portion of the receiver. The integral Picatinny rail serves as a versatile mounting platform for various accessories, such as scopes and sights, while the recoil lug effectively distributes recoil forces and enhances the receiver's durability and accuracy.

The reinforcing feature preferably tapers in thickness both laterally moving away from the centerline of the barrel and longitudinally, moving away from the centerline of the receiver distally and proximally. The lateral length of the blade is generally greater than 5 millimeters but often less than 20 millimeters, and its thickness ranges from greater than 1 millimeter to less than 10 millimeters. This tapered design optimizes material usage while maximizing structural benefits.

By integrating these features into the receiver through advanced manufacturing techniques, the invention offers a robust, efficient, and customizable solution that improves the performance and longevity of firearms.

There are various types, designs and materials of receivers, such as bolt action receivers or other receivers in which this novel approach applies equally-such as a shotgun, rifle, carbine or in some cases pistols.

In general, according to one aspect, the invention features a firearm receiver, comprising a reinforcing feature integral with the receiver fabricated via 3D metal printing below an ejection port.

In operation, the feature behaves like an arch bridge to increase rigidity of the receiver in a region of an ejection port.

In general, according to another aspect, the invention features a receiver for a firearm, comprising a reinforcing feature integrally formed with the receiver below an ejection port, wherein the reinforcing feature extends longitudinally from a proximal receiver bridge to a distal receiver bridge, enhancing the structural rigidity of the receiver.

Preferably, the reinforcing feature tapers in thickness both laterally away from the centerline of the receiver and/or longitudinally toward the distal end of the receiver. In addition, the reinforcing feature can extend into a barrel boss region of the receiver, providing additional structural support.

A Picatinny rail integrally formed along a top surface of the receiver can be placed above the ejection port, the Picatinny rail being fabricated as part of a metal 3D printing process used to fabricate the receiver.

The reinforcing feature is integrally connected to a metal strip located between the ejection port and a magazine well of the receiver in the current embodiment.

A recoil lug can be added that is integrally formed at a distal end portion of the receiver, the recoil lug being fabricated as part of the metal 3D printing process and configured to distribute recoil forces to a stock.

Preferably, the receiver and all integrally formed components are fabricated as a single, monolithic structure using metal 3D printing technology.

In particular, the lateral length of the reinforcing feature is usually greater than 5 millimeters and less than 20 millimeters. The thickness of the reinforcing feature can be greater than 1 millimeter and less than 10 millimeters.

In operation, the reinforcing feature functions as an arch bridge to distribute stresses and reduce flexion during firing, thereby increasing the rigidity and reducing fatigue at an area around the ejection port.

In general, according to another aspect, the invention features a method of manufacturing a firearm receiver. The method comprises fabricating a receiver for receiving a bolt assembly via additive manufacturing and integrally forming a reinforcing feature integral with the receiver below an ejection port of the receiver.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
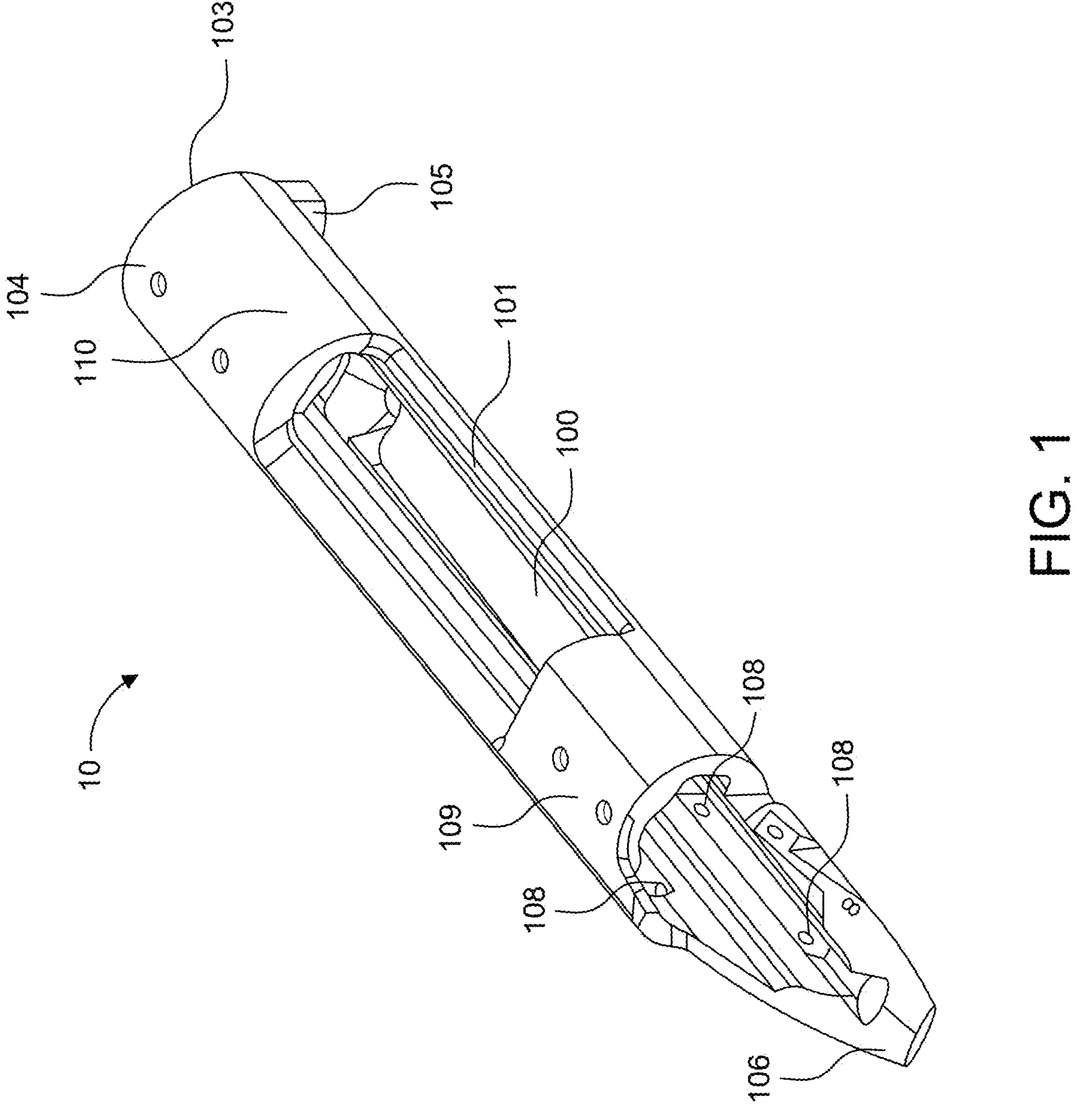
FIG. 1 is a perspective view of a traditional bolt receiver.

FIG. 1 is a perspective view of a traditional bolt receiver 10, which is typically fabricated by machining from billet material.

The traditional bolt receiver 10 generally has a proximal end portion 106 with bolt slot 108, that receives the bolt assembly extending inward, a distal end portion 103, ejection port 100, proximal receiver bridge 109, a distal receiver bridge 110, and barrel boss 104.

Traditionally, the bolt receiver 10 has considerable material removed in order to form the ejection port. Therefore, around ejection port 100, there are weak points 101 that contribute to reduced rigidity of the receiver, allowing flexion during firing and eventually leading to fatigue. While the proximal receiver bridge 109, distal bridge 110, and barrel boss 104 contribute some rigidity and help contain the pressures during firing, they are often insufficient to fully ensure the receiver's overall rigidity and resistance to fatigue.

Figure 2:
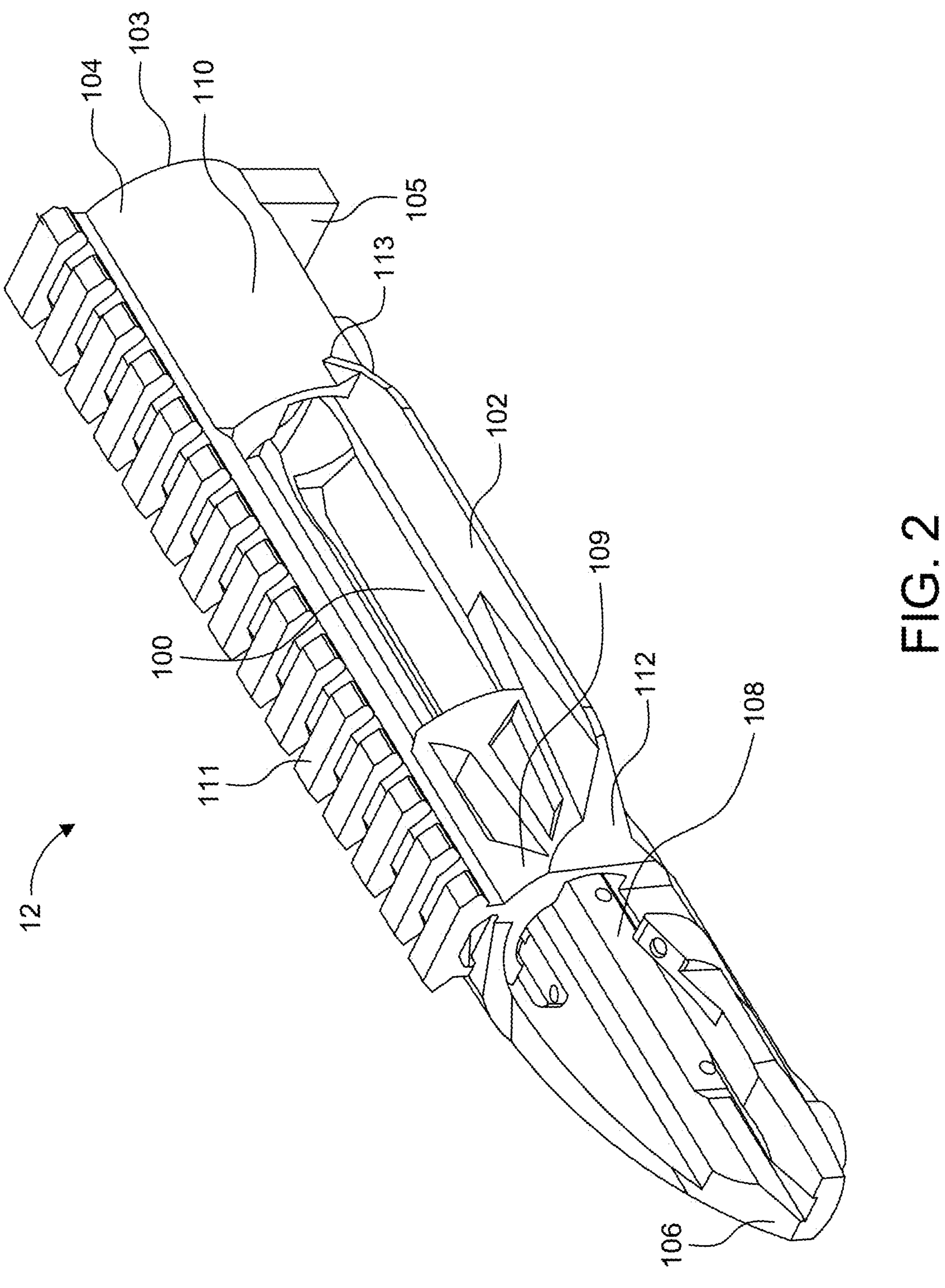
FIG. 2 is a perspective view of a bolt receiver according to the present invention showing a reinforcing blade or feature provided on the bolt receiver below the ejection port of the bolt action, preferably fabricated using metal 3D printing technology.

FIG. 2 shows the inventive receiver 12 with a reinforcing feature or blade 102 according to the present invention. The illustrated example is a bolt-action type receiver.

The receiver 12 in some examples is made using traditional machining techniques. In the preferred embodiment, however, it is fabricated using metal 3D printing, or metal additive manufacturing. In general, when made additively, the receiver 12 is built layer by layer by fusing metal materials in different forms such as powder, wire, or sheets. Key types of additive manufacturing that can be used include Selective Laser Melting (SLM) and Direct Metal Laser Sintering (DMLS), which use high-powered lasers to fully melt or sinter metal powders in a powder bed to create precise, high-strength parts; Electron Beam Melting (EBM), similar to SLM but utilizing an electron beam in a vacuum chamber, ideal for materials like titanium; Binder Jetting, where a liquid binder selectively adheres metal powder particles that are later sintered in a furnace, suitable for complex geometries without requiring full density; Directed Energy Deposition (DED), which melts metal feedstock—either powder or wire—as it is deposited, allowing for the creation or repair of large-scale components; and Metal Extrusion processes like Bound Metal Deposition, where metal powder bound with a polymer is extruded and later sintered to form solid metal parts.

The reinforcing bladed feature 102 is provided on the bolt receiver 12 below the ejection port 100 of a bolt action. In a preferred embodiment, the bolt receiver 12 is fabricated with the metal 3D printing, with the blade 102 being integral with the rest of the bolt receiver 12.

A Picatinny rail 111 is preferably located above ejection port 100 running along the top of the receiver 12. Preferably, the rail 111 is also integral with the rest of the receiver 12 and fabricated as part of the metal 3D printing process used to fabricate the receiver 12. It serves as a versatile mounting platform for various accessories such as scopes and red dot sights.

Bolt slot 108 receives and guides the bolt assembly's movement, stabilizes the bolt, supports locking lugs for operation. Recoil lug 105 and distal end portion 103 distribute recoil forces, improve durability of the bolt receiver, enhance accuracy and prevent action movement. Preferably, the recoil lug 105 is also integral with the rest of the bolt receiver 12 and fabricated as part of the 3D printing process used to fabricate the rest of the receiver 12.

The reinforcing feature or blade 102 has a proximal end 112 that connects to the proximal receiver bridge 109 and a distal end 113 that connects to the distal receiver bridge 110 and also possibly extends into the region of the barrel boss 104. This feature functions like an arch bridge, significantly enhancing the rigidity of the action and receiver 110 at one of its identified weakest points, around and specifically preferably below the ejection port 100. Its bladed profile extend from a point before the proximal end of the ejection port 100, aft to the other end and past the ejection port 100.

In the illustrated example, the thickness of the reinforcing blade 102 tapers moving away from the centerline or axis of the receiver 12 or barrel axis. In the illustrated example, the thickness of the reinforcing blade 102 also tapers toward the distal end 113, getting thinner moving forward across the length of the ejection port 100.

Figure 3:
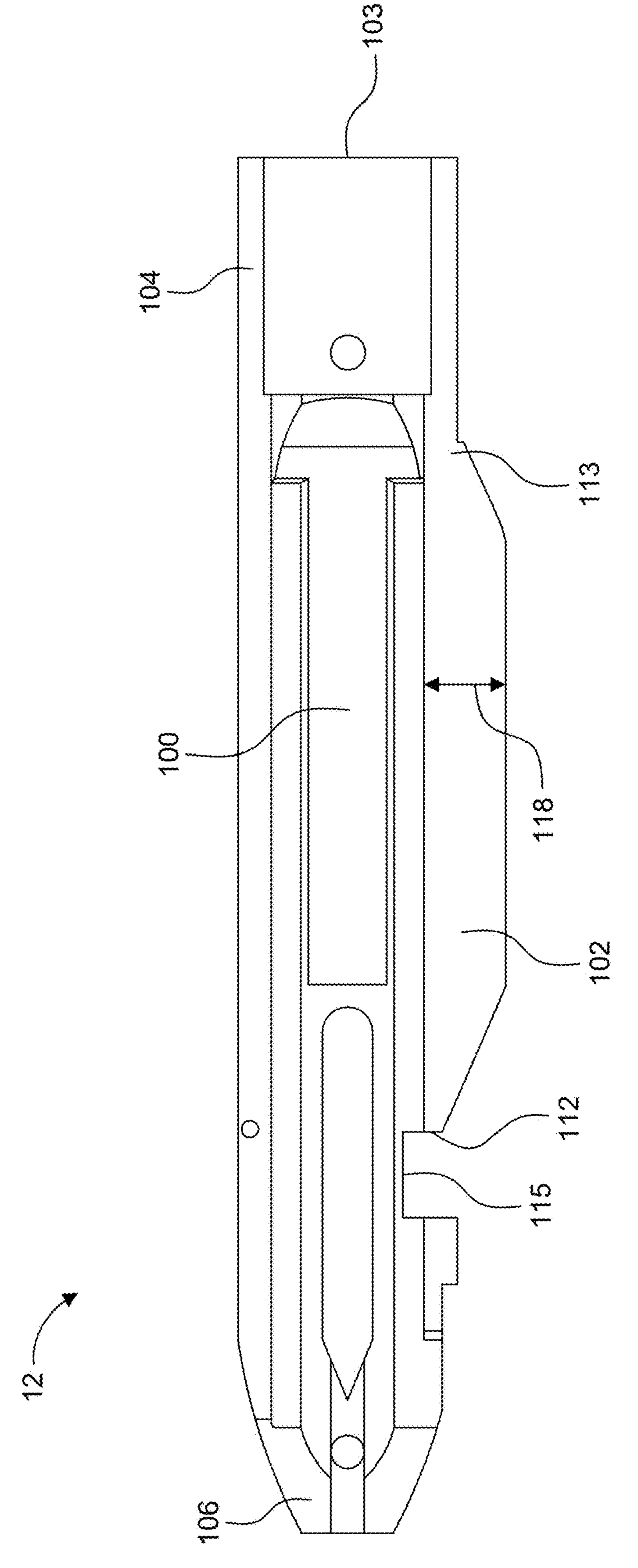
FIG. 3 is a top cross-sectional view of the invention bolt receiver showing the bladed feature extending the entire length of the ejection port opening and possibly extending both forward and rearward of the ejection port for material strength and surface blending purposes.

FIG. 3 is a top cross-sectional view of the inventive receiver showing the profile of blade feature 102 tapering into the receiver 12 moving proximally and ending before a notch 115 for accommodating the bolt handle. It also tapers moving distally smoothly transitioning into the receiver in the region of the barrel boss 104.

The lateral length 118 of the reinforcing blade 102 is generally greater than 5 millimeters (mm) but often less than 20 mm.

Figure 4:
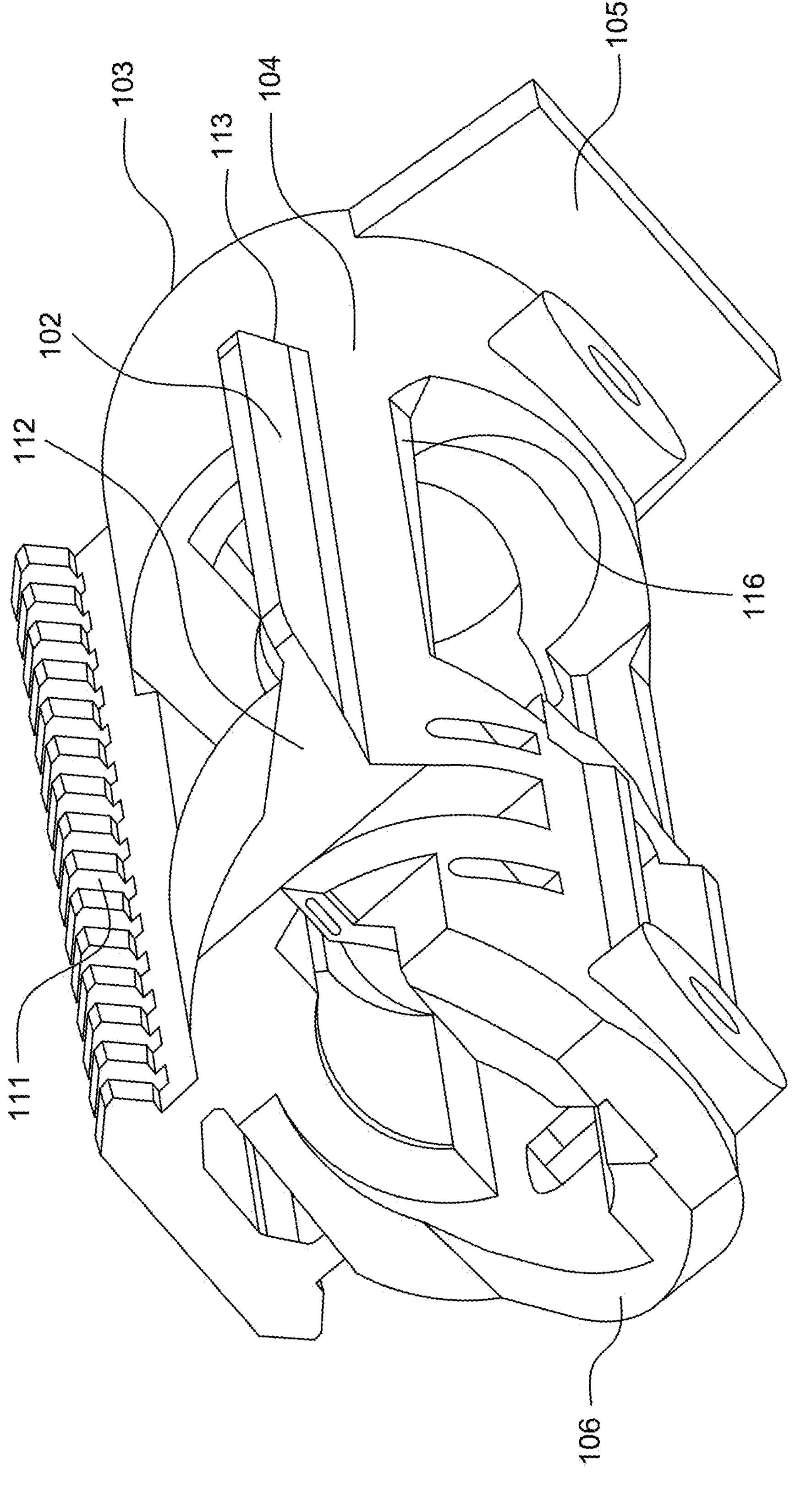
FIG. 4 is another perspective view of the inventive bolt receiver, highlighting the reinforcing blade feature.

FIG. 4 is another perspective view of the invention bolt receiver, highlighting the reinforcing blade feature. Key components such as the proximal end of the blade and the distal end portion are clearly illustrated.

This angle shows the magazine well 116 along with the recoil lug 105 at the distal end portion 103 of the receiver, and reinforcing blade 102 extending to barrel boss 104, which is connected at the distal end of blade 113.

Figure 5:
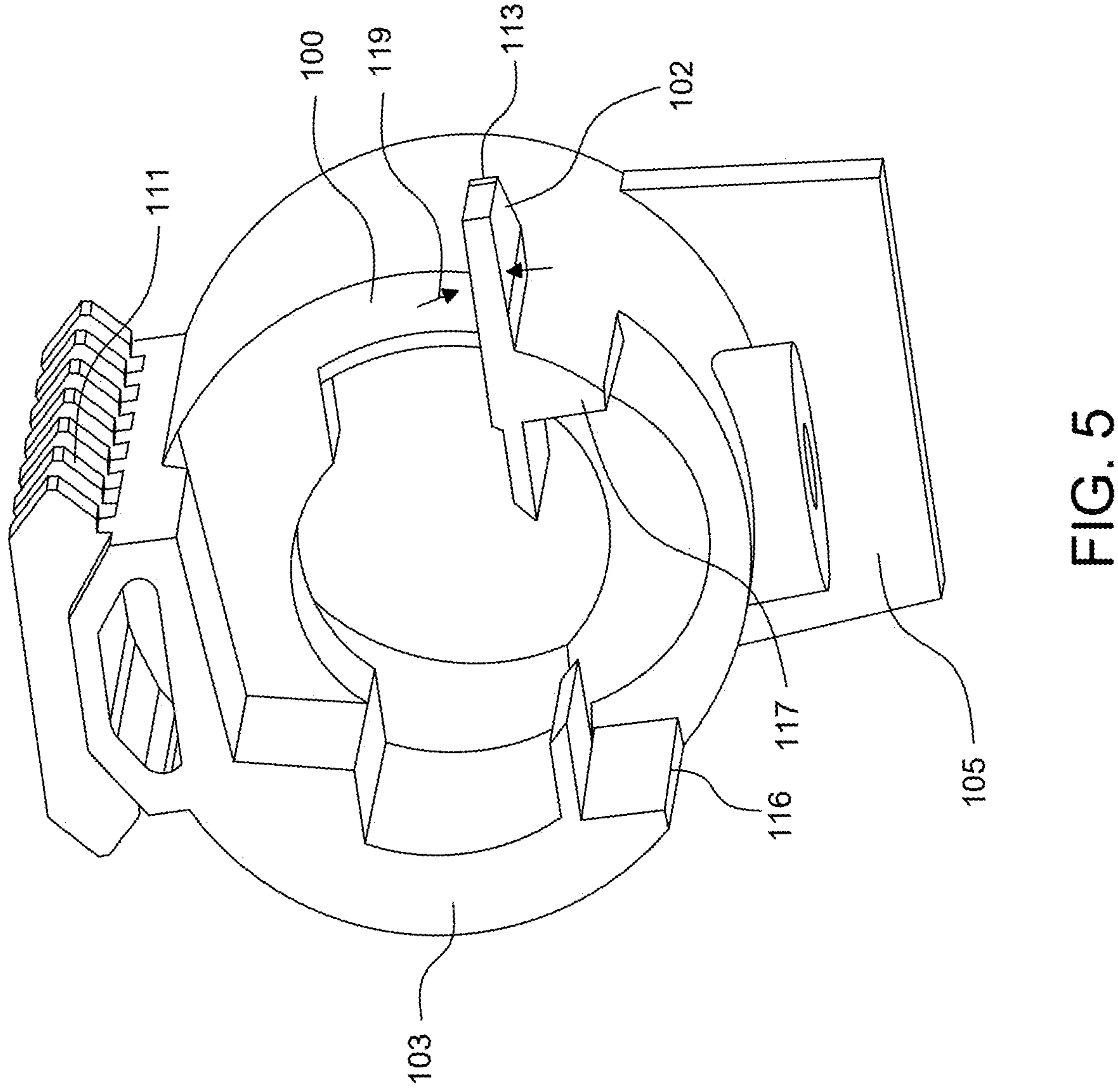
FIG. 5 is a cross-sectional view of the bolt receiver, presenting the cross section of the distal portion of the blade and showcasing the distal end portion of the bolt receiver.

FIG. 5 is a cross-sectional view of the bolt receiver, presenting the cross section through the ejection port and also showing the distal portion 113 of the blade 102 and showcasing the distal end portion of the bolt receiver. Generally, the thickness 119 of the blade 102 is greater than 1 mm and usually less than 10 mm. The blade is connected to the metal strip 117 between the ejection port above the magazine well 116.

While this invention has been particularly shown and described with references to preferred embodiments thereof, it will be understood by those skilled in the art that various changes in form and details may be made therein without departing from the scope of the invention encompassed by the appended claims.

What is claimed is:

1. A receiver for a firearm, comprising:

a reinforcing blade integrally formed with the receiver below an ejection port, wherein the reinforcing blade extends longitudinally from a proximal receiver bridge to a distal receiver bridge, the reinforcing blade being integrally connected to a metal strip located between the ejection port and a magazine well of the receiver, and the reinforcing blade tapering in thickness both laterally away from a centerline of the receiver and longitudinally toward a distal end of the receiver, thereby enhancing the structural rigidity of the receiver.

2. The receiver of claim 1, wherein a lateral length of the reinforcing blade is greater than 5 millimeters and less than 20 millimeters, and the thickness of the reinforcing blade is greater than 1 millimeter and less than 10 millimeters.

3. The receiver of claim 1, wherein the reinforcing blade extends into a barrel boss region of the receiver, providing additional structural support.

4. The receiver of claim 1, further comprising a Picatinny rail integrally formed along a top surface of the receiver above the ejection port, the Picatinny rail being fabricated as part of a metal 3D printing process used to fabricate the receiver.

5. The receiver of claim 1, further comprising a recoil lug integrally formed at a distal end portion of the receiver, the recoil lug being fabricated as part of the metal 3D printing process and configured to distribute recoil forces to a stock.

6. The receiver of claim 1, wherein the receiver and all integrally formed components are fabricated as a single, monolithic structure using metal 3D printing technology.

7. The receiver of claim 1, wherein the reinforcing blade functions as an arch bridge to distribute stresses and reduce flexion during firing, thereby increasing the rigidity and reducing fatigue at an area around the ejection port.

8. A method of manufacturing a firearm receiver, comprising:

fabricating a receiver for receiving a bolt assembly via additive manufacturing, the receiver being fabricated as a single monolithic structure; and integrally forming a reinforcing blade integral with the receiver below an ejection port of the receiver, the reinforcing blade extending longitudinally from a proximal receiver bridge to a distal receiver bridge and being integrally connected to a metal strip located between the ejection port and a magazine well of the receiver; and forming the reinforcing blade to taper in thickness both laterally away from a centerline of the receiver and longitudinally toward a distal end of the receiver.

9. The method of claim 8, further comprising fabricating the reinforcing blade to extend into a barrel boss region of the receiver, and integrally forming a Picatinny rail along a top surface of the receiver above the ejection port and a recoil lug at a distal end portion of the receiver as part of the single monolithic structure.

10. The method of claim 8, wherein the additive manufacturing comprises one of Selective Laser Melting (SLM), Direct Metal Laser Sintering (DMLS), Electron Beam Melting (EBM), Binder Jetting, Directed Energy Deposition (DED), or metal extrusion, and wherein the receiver and the reinforcing blade are fabricated layer by layer as a unitary piece without joints or bonds.

11. The receiver of claim 1, wherein the receiver is a bolt-action receiver, and the reinforcing blade is positioned on a side of the receiver opposite to the ejection port relative to a longitudinal axis of the receiver.

12. The receiver of claim 1, wherein the reinforcing blade has a proximal end connected to the proximal receiver bridge and a distal end connected to the distal receiver bridge, and the reinforcing blade extends continuously without interruption between the proximal and distal ends.

13. The receiver of claim 1, wherein the reinforcing blade tapers to a feathered edge where it transitions into the proximal receiver bridge and the distal receiver bridge.

* * * * *